United States Patent
Ziganki

(10) Patent No.: US 9,605,445 B2
(45) Date of Patent: Mar. 28, 2017

(54) COMPONENT CARRIER FOR SUBSTANTIALLY ELECTRICAL COMPONENTS

(75) Inventor: Andreas Ziganki, Mettmann (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 0 days.

(21) Appl. No.: 13/130,562

(22) PCT Filed: Nov. 6, 2009

(86) PCT No.: PCT/DE2009/001572
§ 371 (c)(1),
(2), (4) Date: Jun. 17, 2011

(87) PCT Pub. No.: WO2010/060410
PCT Pub. Date: Jun. 3, 2010

(65) Prior Publication Data
US 2011/0242786 A1    Oct. 6, 2011

(30) Foreign Application Priority Data

Nov. 27, 2008  (DE) .................... 20 2008 015 696 U

(51) Int. Cl.
| | | |
|---|---|---|
| E05B 17/22 | (2006.01) | |
| E05B 17/00 | (2006.01) | |
| H01H 13/06 | (2006.01) | |
| H02G 3/08 | (2006.01) | |
| E05B 47/00 | (2006.01) | |

(52) U.S. Cl.
CPC .......... *E05B 17/22* (2013.01); *E05B 17/0004* (2013.01); *E05B 2047/0069* (2013.01); *H01H 13/06* (2013.01); *H02G 3/086* (2013.01)

(58) Field of Classification Search
CPC ................ E05B 17/22; E05B 17/0004; E05B 2047/0069
USPC ........................ 361/797; 220/4.01, 4.28–4.34
See application file for complete search history.

(56) References Cited

U.S. PATENT DOCUMENTS

| | | | | |
|---|---|---|---|---|
| 4,209,820 | A * | 6/1980 | Rundel et al. ................. | 361/622 |
| 4,858,076 | A * | 8/1989 | Tsai ............................... | 361/811 |
| 4,860,167 | A * | 8/1989 | Trumpler et al. .............. | 361/807 |
| 6,215,672 | B1 * | 4/2001 | Warner et al. ................. | 361/785 |
| 6,395,981 | B1 * | 5/2002 | Ford et al. ....................... | 174/50 |
| 7,142,433 | B2 | 11/2006 | Lechner | |
| 2004/0257782 | A1 * | 12/2004 | Kerner .......................... | 361/797 |
| 2005/0083667 | A1 * | 4/2005 | Lai et al. ....................... | 361/797 |
| 2006/0120040 | A1 * | 6/2006 | Chen ............................. | 361/695 |

(Continued)

FOREIGN PATENT DOCUMENTS

| | | |
|---|---|---|
| DE | 103 26 141 B4 | 11/2005 |
| DE | 20 2007 001795 U1 | 4/2007 |

(Continued)

*Primary Examiner* — Adrian S Wilson
*Assistant Examiner* — Abhishek Rathod
(74) *Attorney, Agent, or Firm* — Andrew Wilford

(57) ABSTRACT

A component carrier for substantially electrical components (1), in particular for electrical/electronic components (1) as parts of motor vehicle locking systems, preferably motor vehicle door lock component carriers, comprising a main part (2) and at least one side wall (3, 4), wherein the side wall (3, 4) is detachably connected to the main part (2) at least in some regions.

7 Claims, 1 Drawing Sheet

(56) References Cited

U.S. PATENT DOCUMENTS

| | | |
|---|---|---|
| 2007/0147017 A1* | 6/2007 | Eom .............................. 361/809 |
| 2011/0205724 A1* | 8/2011 | Nakajima et al. ............ 361/809 |
| 2012/0026714 A1* | 2/2012 | Martino et al. ............... 361/809 |

FOREIGN PATENT DOCUMENTS

| | | |
|---|---|---|
| DE | 20 2007 005 076 U1 | 9/2007 |
| DE | 10 2006 037 159 A1 | 2/2008 |
| JP | 48-012698 B | 4/1973 |
| JP | 01-123351 U | 8/1989 |
| JP | 2000-208949 A | 7/2000 |
| JP | 2002-252482 A | 9/2002 |
| JP | 2004-217146 A | 8/2004 |
| JP | 2005-340698 A | 12/2005 |
| JP | 2006-107867 A | 4/2006 |
| JP | 2007-009414 A | 1/2007 |

\* cited by examiner

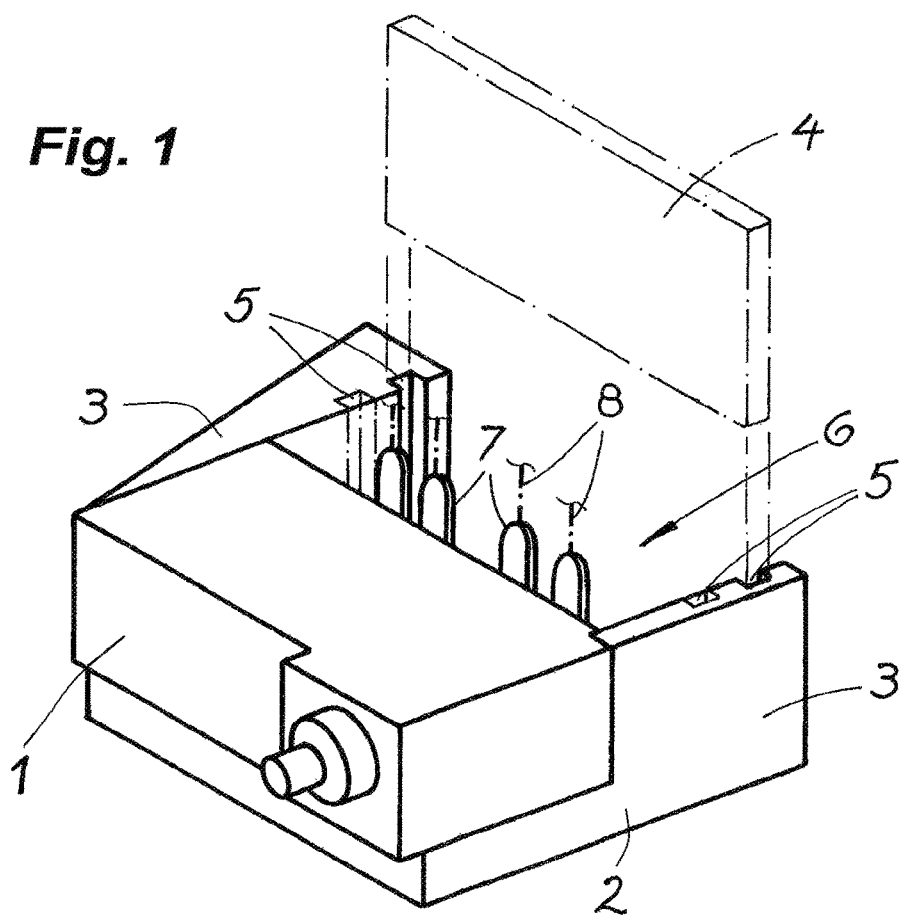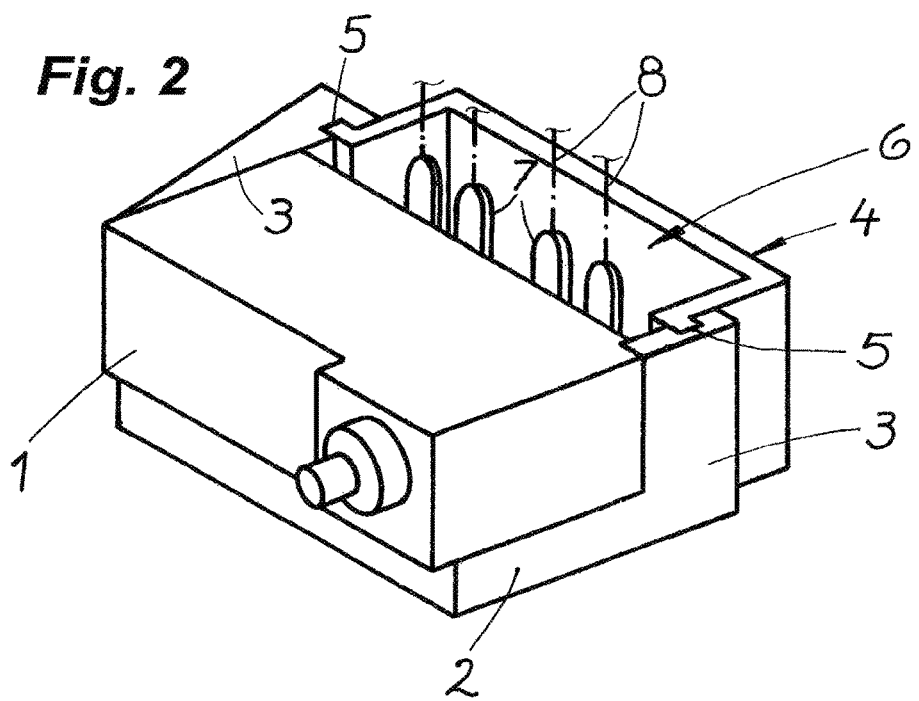

COMPONENT CARRIER FOR SUBSTANTIALLY ELECTRICAL COMPONENTS

CROSS REFERENCE TO RELATED APPLICATIONS

This application is the US-national stage of PCT application PCT/DE2009/001572 filed 6 Nov. 2016 with a claim to the priority of German patent application 20 2008 015 696.3 filed 27 Nov. 2008.

FIELD OF THE INVENTION

The invention relates to a holder for substantially electrical components, in particular for electrical/electronic components as part of motor vehicle locking systems, preferably motor vehicle door lock holders comprising a base and at least one side wall.

BACKGROUND OF THE INVENTION

Holders for electrical or electronic components are used in practical applications to accommodate and combine different electrical/electronic as well as mechanical components inside, for instance a motor vehicle door lock. An electro-mechanical assembly with the arrangement described above, is for instance described in DE 103 26 141 B4. The invention discloses a signal line and a contact field formed by a flexible printed circuit. The aim is to achieve a longer service life.

A comparable holder is disclosed in DE 20 2007 005 076 U1 that relates to a holder for a closing system, in particular a holder for electrical components of a motor vehicle door lock. The holder is made of a single piece and contains at least one first section and one second section. A delicate linear connection is provided between the two sections.

Finally DE 10 2006 037 159 A1 describes a wired electrical assembly and a process for its production. The invention discloses a holder in which the accommodated components are secured on or in a floor area of the said holder. Circuit wires running across the floor area are secured to the connection areas of the components. The free space above the floor area, covered by circuit wires, is filled with a sealing compound. This sealing compound substantially protects the contacts or contact connections of the electrical/electronic components retained and accommodated by the holder. The casting compound also provides the required stability of the thus assembled holder.

Because of this method, a relatively wide design of the thus formed potting cavity is inevitable, as prior to applying the sealing compound, the electrical and/or mechanical connections must be established. This means that the potting cavity to be filled must have sufficient space to allow the use of respective jointing techniques, such as soldering, gluing, bonding, etc. At present, potting cavities are, in any case, rather large. Consequently a not inconsiderable amount of sealing compound is required for filling the potting cavity and sealing the electrical/mechanical connections contained therein. This in turn results in considerable costs due to, on one hand, the required amount of sealing compound and, on the other hand, due to the fact that the filling of the potting cavity takes a considerable amount of time. This is where the invention provides a solution.

SUMMARY OF THE INVENTION

The invention is based on the technical problem of further developing a holder of the described type in such a way that the amount of sealing compound required is reduced and production time during filling is shortened, thus resulting in lower production costs.

In order to solve the problem the holder of the described type is provided with a side wall that is at least partially detachably connected to the base.

In general, the side wall contains at least two parts, with one part being a fixed wall inseparably connected or inseparably connectable to a base and a movable wall, detachably connected or detachably connectable to the base. In most cases the base and the fixed wall form a single-piece component, such as a plastic injection molded part. The movable wall is detachably connected to this unit consisting of the base and the fixed wall.

It has proven to be advantageous if the movable wall is guided in grooves. Naturally, the design can also comprise several movable walls and thus several movable walls guided in grooves. The grooves for the one movable wall or several movable walls can be formed on the fixed wall and/or the electrical component or the several electric components. The invention is based on the fact that the electrical component is often a part of the side wall and is integrated in the side wall. In this way, the housing of the electrical component is basically used as a side wall or a part thereof.

The grooves in the fixed wall and/or the electrical component generally extend transversely to the longitudinal extension of the fixed wall of the side wall or to the longitudinal extension of the electrical component. In this way, the movable wall of the side wall or of the movable wall can be inserted from above into an aperture and can be pulled out again from this aperture, when required. The aperture is defined in the side wall or in the fixed wall or between the fixed wall and the electrical component or between two electrical components and can be sealed with the aid of the movable wall so that, with the movable wall inserted, a potting cavity is formed. In this case, the base and the fixed wall connected to the base and the at least one movable wall or the movable wall form the respective potting cavity that can then be filled with a plastic-based hardening sealing compound.

Of special significance for the invention is a design in which the movable wall of the side wall, when viewing the base from above, is arranged directly against or in close proximity to the connection elements of the electrical component or actually the electrical component. This means that the movable wall of the side wall or the movable wall or the several movable walls are pressed against the parts to be encapsulated and, in particular, against the electrical components located in the potting cavity or the electrical components defining a part of the potting cavity. In fact the movable wall or the movable wall directly adjoin the connection elements of the respective electrical component or are positioned in close proximity thereto.

The invention thus achieves that the electrical component is contacted and that contact can also be advantageously provided, as in the area of the connection elements of the electrical component the aperture is advantageously located into which the movable wall is inserted after contacting. This means that the electrical component is contacted first, after which the movable wall is connected to the fixed wall of the side wall. Only then is the potting cavity defined and can be finally filled and sealed with the hardening sealing compound.

In this way, the invention provides unimpeded and free access to the connection elements of the electrical component, as at this point the aperture in the side wall provides a respective access and, for instance, easy access for soldering. This also allows the option of standardizing the holder of the invention. In fact it is feasible that depending on the electrical component accommodated on the holder and thus the dependency of the topological arrangement of the connection element of the respective component compared to the base, different positions of the insertable movable wall are possible.

This means that depending on the electrical component connected to the base, the fixed wall of the side wall contains several grooves, so that the movable wall, inserted into the grooves after contacting, assumes a desired position directly adjoining or in close proximity to the connection elements. It is thus in any case ensured that the movable wall of the side wall is arranged in the area of the connection element of the electrical component accommodated in the base.

The invention thus not only considerably reduces the amount of required sealing compound but also reduces the production cost of a thus finished holder due to the fact that the application of the sealing compound is quicker because of the low amount required and also due to the fact that because of its standardized design, the holder can be produced in larger quantities than before.

Finally, a design is in most cases chosen for the device in which, when viewed from the side, the side wall and the electrical component, forming in most cases a part of the side wall, are of about equal height. Also, the side wall and the electrical component together encapsulate said potting cavity. As already explained, the potting cavity is open during the connecting of the electrical component to the holder or its base and also during its contacting, insofar as the aperture for accommodating the one or several movable wall(s) in the side wall is open.

Only once all electrical connections have been established is the movable side wall or the movable wall detachably inserted into the grooves located on the side of the aperture and extending transversely to the longitudinal extension of the side wall. It is indeed feasible to move the movable wall as close as possible to the connection elements, with any previously assumed position generally still being correctable as a result of the detachable connection to the fixed wall of the side wall. This applies in particular where several grooves are provided to the side of the aperture, allowing fixing of the movable wall at a variable distance to the connection elements.

Generally, the invention is based on the knowledge that usually an electrical component constitutes a part of a side wall and forms the potting cavity together with the other side wall. At the same time, the connection elements providing the electric contact for the component are located inside the potting cavity or are arranged on a back wall of the electrical component facing inwards. The electrical connection elements can be so-called soldering tags, extending substantially perpendicularly from the rear wall of the electrical component and pointing to the inside of the potting cavity. Naturally, the electrical connection elements or soldering tags are connected at such a height to the respective rear wall of the electrical component that they will in any case be covered by the sealing compound filled in the later formed potting cavity. These are the main advantages of the invention.

BRIEF DESCRIPTION OF THE DRAWINGS

Below, the invention is explained in more detail with reference to exemplary drawings showing only one embodiment, as follows:

FIG. 1 shows a section of the holder of the invention without the installed movable wall; and FIG. 2 shows an adapted arrangement of the holder of FIG. 1 with the movable wall installed and prior to the application of the sealing compound.

Other features and advantages of the present invention will become apparent from the following detailed description, taken in conjunction with the accompanying drawings that illustrate, by way of example, the principles of the invention.

DETAILED DESCRIPTION OF THE INVENTION

The exemplary figures show a holder and, in particular, a motor vehicle door lock holder, substantially housing electrical components. These electrical components 1 in the embodiment are, although the invention is not restricted to this, a switch 1, such as a rotary latch switch of a motor vehicle door lock. In fact, the holder is positioned inside a motor vehicle door lock with the electrical component or the switch 1 detecting the position of a rotary latch element inside the motor vehicle door lock. Apart from the electrical components or switch 1, the holder could generally also contain mechanical elements, such as a worm gear, as disclosed in the aforementioned DE 103 26 141 B4. Details of this have, however not been shown in the figure.

Such a holder serves in any case to substantially accommodate one or several electrical components 1 together with the holder positioned inside the motor vehicle door lock in the example. As a result, the electrical components or the switch 1 are directly moved into the correct position and assembly of the motor vehicle door lock is simplified by the arrangement being reduced to a few individual components. In order to ensure the permanent functioning of the electrical component or of the switch 1 in the example and prevent its electrical contact being affected by environmental influences, the electrical component or the switch 1 and the holder are encapsulated. For this purpose, the holder is substantially made up of a base 2 and side walls 3 and 4.

According to the invention, the holder consists of two parts, a base 2 with an inseparably linked or an inseparably linkable fixed wall 3 and a movable wall 4 detachably connectable to the base 2. The base 2 and the fixed wall 3 form in fact a single piece, a plastic injection molded part in this embodiment. In contrast, the movable wall 4 is a part of the side walls 3 and 4 detachably connected in this way with the base 2.

As part of this arrangement, the movable wall 4 is guided in grooves 5.

Although the invention is not limited to this, the grooves 5 in the embodiment for guiding the movable walls 4 or the movable wall are arranged in each case at the end of the fixed wall 3 of the side walls 3 and 4. The grooves 5 extend transversely to the longitudinal extension of the fixed component 3 of the side walls 3 and 4, so that the movable wall 4 can be detachably inserted and removed again from an aperture 6 defined in this way. The movable wall 4 is in fact inserted into the respective aperture 6 from the top. For this process, several positions of the movable wall 4 are feasible, as several pairs of opposing grooves 5 are provided as indicated in FIG. 1.

It is apparent that the electrical component or the switch 1 is first of all integrated in the side walls 3 and 4 or is a part of the side walls 3 and 4. Furthermore, the electrical component contains connection elements 7 or the switch 1 in its rear wall, facing the inside of a potting cavity formed by the base 2, the side walls 3, 4 and finally the electrical component 1. In this way, contact with the connection elements 7 can be easily provided through the aperture 6 with the movable wall 4 removed, for instance by soldering to the connection lines 8.

In the shown example, these connecting lines 8 extend upward out of the potting cavity. Once contact with the electrical component 1 has been made, the movable wall 4 is connected to the fixed wall 3 of the side walls 3 and 4, so that the potting cavity is now closed. A hardening plastic sealing compound can then be poured into the thus closed potting cavity.

As the side walls 3 and 4 and the electrical component 1 integrated in the side walls 3 and 4 or forming a part of the side walls 3 and 4 are of about equal height when viewed from the side, it is ensured that the highest of the connection elements 7, not exceeding the height of the side walls 3 and 4, are covered by the sealing compound filled into the potting cavity 1 to 4 and are sealed correctly and permanently.

Of special significance is the fact that, when viewing the base 2 from the top, the movable wall or the movable wall 4 of the side walls 3 and 4 is arranged or can be arranged directly adjacent or at close proximity to the connection elements 7. As a result, the size of the potting cavity can be reduced to a minimum. In this context there is also the option of using several apertures 6, formed by the respective fixed wall 3 of the side walls 3 and 4 with the aid of the lateral grooves 5. This is indicated in FIG. 1.

Depending on the size of the electrical component 1 integrated in the side walls 3 and 4, the movable wall or the movable wall 4 of the side walls 3 and 4 can be arranged at different positions, as indicated in FIG. 1. As a result, a standardized holder can be used that can be combined with various electrical components 1. Last, FIG. 2 indicates the further option of using other movable walls 4, shown in the example as being generally U-shaped and that connect to the rear wall of the electrical component 1.

It is to be understood that the above-described embodiment is illustrative of only one of the many possible specific embodiments that can represent applications of the principles of the invention. Numerous and varied other arrangements can be readily devised by those skilled in the art without departing from the spirit and scope of the invention.

What is claimed is:

1. In a motor-vehicle door latch and in combination with a plurality of connection lines and with an electrical/electronic switch forming part of a motor-vehicle latch system and having a plurality of electrical contacts, a holder comprising:
    a base;
    at least one fixed side wall integral with and extending upward from the base, the switch being fixed to the fixed side wall with the contacts extending upward away from the base, the fixed side wall forming an aperture open horizontally away from the contacts of the base; and
    a movable side wall releasable attachable at the aperture with the fixed side wall and base adjacent the electrical contacts such that:
    when the movable side wall is not fitted with fixed side wall and base, the aperture is horizontally open and the contacts can be accessed through the aperture for fitting the connection lines from above with the contacts and,
    when the movable side wall is fitted with the fixed side wall and base, it forms with the base, the switch, and the fixed side wall an upwardly open cavity holding the electrical contacts and fillable with a hardenable potting compound, the connection lines extending upward out of the fillable cavity.

2. The holder defined in claim 1, wherein the fixed side wall is formed with grooves into which the movable side wall can slide to form the cavity with the fixed side wall and base.

3. The holder defined in claim 2, wherein the grooves extend vertically generally perpendicular to the base.

4. The holder defined in claim 3, wherein the contacts are aligned in a row and, when the movable wall is fitted in the grooves the fixed side wall and sitting on the base, the movable wall extends at a spacing parallel to the row of contacts.

5. The holder defined in claim 1, wherein the fixed and movable side walls, the contacts of the switch, and the switch all extend substantially the same distance from the base such that when the cavity is full of the potting compound the switch and contacts are substantially covered.

6. The holder defined in claim 1, wherein the base and fixed side wall are unitarily formed of plastic.

7. The holder defined in claim 1, wherein the fixed side wall has a pair of generally parallel parts extending from the switch, projecting upward from the base, and forming the aperture.

* * * * *